May 30, 1967 H. W. JOHNSON, JR 3,322,936

PREPARING AND READING FREQUENCY-MODULATED TAPE RECORDS

Filed Oct. 31, 1962 2 Sheets-Sheet 1

INVENTOR:

HENRY WILSON JOHNSON, JR.

BY: Oswald H. Milmore

HIS ATTORNEY

May 30, 1967 H. W. JOHNSON, JR 3,322,936

PREPARING AND READING FREQUENCY-MODULATED TAPE RECORDS

Filed Oct. 31, 1962 2 Sheets-Sheet 2

INVENTOR:
HENRY WILSON JOHNSON, JR.

BY: Oswald H. Milmore
HIS ATTORNEY

United States Patent Office 3,322,936

Patented May 30, 1967

3,322,936

PREPARING AND READING FREQUENCY-MODULATED TAPE RECORDS

Henry Wilson Johnson, Jr., Walnut Creek, Calif., assignor to Shell Oil Company, New York, N.Y., a corporation of Delaware Filed Oct. 31, 1962, Ser. No. 234,502
8 Claims. (Cl. 235—61.11)

The invention relates to the preparation and analysis of signals recorded as a series of pulses of variable density along a tape or strip, such as a magnetic or optical tape. A record of this type is herein for brevity called a frequency-modulated record in that it contains a series of signal elements—magnetic bits on amagnetic tape or dots or transverse lines of contrasting opacity on an optical film—which occur at a frequency which is modulated to convey information.

The invention is applicable to a wide variety of signals representing different types of data, such as the output from a capillary or other gas-liquid chromatographic instrument (herein for brevity called a GLC unit), wherein the source signal is in analog form, e.g., a voltage or current density which represents measurements made on the effluent stream of a property thereof, e.g., thermal conductivity measured in a thermal conducitivity cell, the said source signal increasing from a base amplitude (which may be zero) each time a component separated in the GLC unit passes through the cell. Such a source signal is often recorded by transforming the voltage to frequency in a voltage-to-frequency converter and recording the frequency as a series of signal elements on a tape. One manner of making such a record is described in my copending patent application Ser. No. 77,554, now abandoned, filed Dec. 22, 1960.

The conversion ratio used in making the record is limited by the resolving power of the recording equipment used and possibly also by the characteristics of the converter. The source signal is, in many applications, of low amplitude for extended periods and only occasionally rises to levels at which the corresponding frequencies become so high as to be beyond the capacity of the recorder and/or of the converter. It is, however, desirable to use a high frequency-to-amplitude ratio during period at which the source signal is small so as to gain greater accuracy when the signal is later analyzed.

It is, therefore, the object of the invention to provide an improved method and apparatus for preparing frequency-modulated tape records containing machine-sensitive signal elements which occur at a frequency corresponding to the amplitude of a source signal wherein the ratio of the frequency to the amplitude of the source signal is varied.

A further object is to provide a method and apparatus as above stated wherein the said ratio is varied automatically in accordance with the amplitude of the source signal.

Still another object is to provide an improved method and apparatus for reading tape records containing a series of signal elements which occur on the tape at a density which bears a variable ratio to the amplitude of the source signal represented thereby.

Further objects will become apparent from the following specification.

In summary, according to one aspect of the invention, the source signal is converted into a signal of corresponding frequency at a ratio which is variable, and the converted signal is recorded on one channel of a tape as a series of signal elements, and a ratio signal indicative of the ratio of the converted frequency to the amplitude of the source signal is recorded simultaneously on another tape channel.

In the broadest aspect of the invention, the said ratio may be selected at will, and any form of ratio signal may be used. However, in the preferred embodiment to be described, the ratio is one of a limited plurality of preselected values, i.e., it is varied in steps; conveniently these ratios are multiples of one another, having regard to the counter to be used for counting the signal elements when the tape is read or decoded. Also preferably the ratio signal may take one of two forms which are distinguishable by a reading unit, one form (herein for convenience called a positive bit) indicating an increase in the ratio and the other (herein called a negative bit) for indicating a decrease in the ratio; coded signals may be used both for magnetic tape or optical film as another alternative, signals which indicate an increase in ratio can be recorded in one tape channel and those which indicate a decrease in another channel. Thus, when more than two, e.g., four, different ratios are used, a positive bit is recorded in the ratio channel of the tape each time the conversion ratio is increased one step and a negative bit is recorded each time the ratio decreases one step. However, the invention is not restricted to this embodiment. Thus, when only two ratios are used, there may be a series of plus bits, as desired, through the sections of the tape at which the higher ratio prevails and a series of negative bits in the sections of lower ratio (at least one appropriate bit appearing at the start of the section).

According to still another embodiment the ratio signals may be all alike. When but two ratios are used, each occurrence of a ratio signal denotes a change to the other ratio; and when more than two ratios are used, each occurrence of a ratio signal denotes a change in ratio through a predetermined progression, e.g., from the lowest to the highest and then returning to the lowest. However, the use of ratio signal elements of two kinds or forms is preferred.

The change in ratio is, in the preferred embodiment to be described, effected by attenuating the source signal (e.g., reducing its voltage when the signal is a voltage signal) and feeding the attenuated signal to a converter which of itself operates on a fixed ratio of output frequency to input signal amplitude.

The change in ratios may be performed manually or automatically, in either case by monitoring the amplitude of the source signal. Automatic control of the ratio-selector (viz, of the attenuation when the embodiment of the preceding paragraph is used) can be effected by feeding a part of the source signal to an amplitude-measuring device and changing the ratio in steps as the signal amplitude rises above or falls below predetermined levels.

The tape can be played back at constant or variable speed; the latter possibility is described in detail in my copending application, Serial No. 234,503, filed October 31, 1962.

To read the tape, it is moved past a pair of reading elements, such as magnetic heads in the case of magnetic tape or a head having a light beam and a photocell in the case of an optical film, positioned to read the two tape channels. The signal elements in the first tape channel are converted by the reading element into a series of electrical pulses, and these are applied selectively by suitable switching means to one of the inputs of a multi-position digital counter having an input to each of several digital positions; the reproduced ratio signal is used to control the switching means to select the appropriate input in accordance with the applicable conversion ratio for the section of the tape being read. By this means the counts registered on the counter have a fixed ratio to the source signal, regardless of the ratios used in the different sections of the tape.

The counter is usually of the electronic type, provided with carry-over between digital positions, and may be constructed on any radix, binary, octal and decimal counter being the most common. The ratios used in making the tape record should, of course, be related in accordance with the radix in the counter. For example, when a binary counter is used the frequency-to-source signal amplitude ratios may be 1, 2, 4, 8, etc., while in the case of a decimal counter they may be 1, 10, 100, etc.

The invention will be further described with reference to the accompanying drawings forming a part of this specification and showing certain preferred embodiments, wherein.

Figure 1:
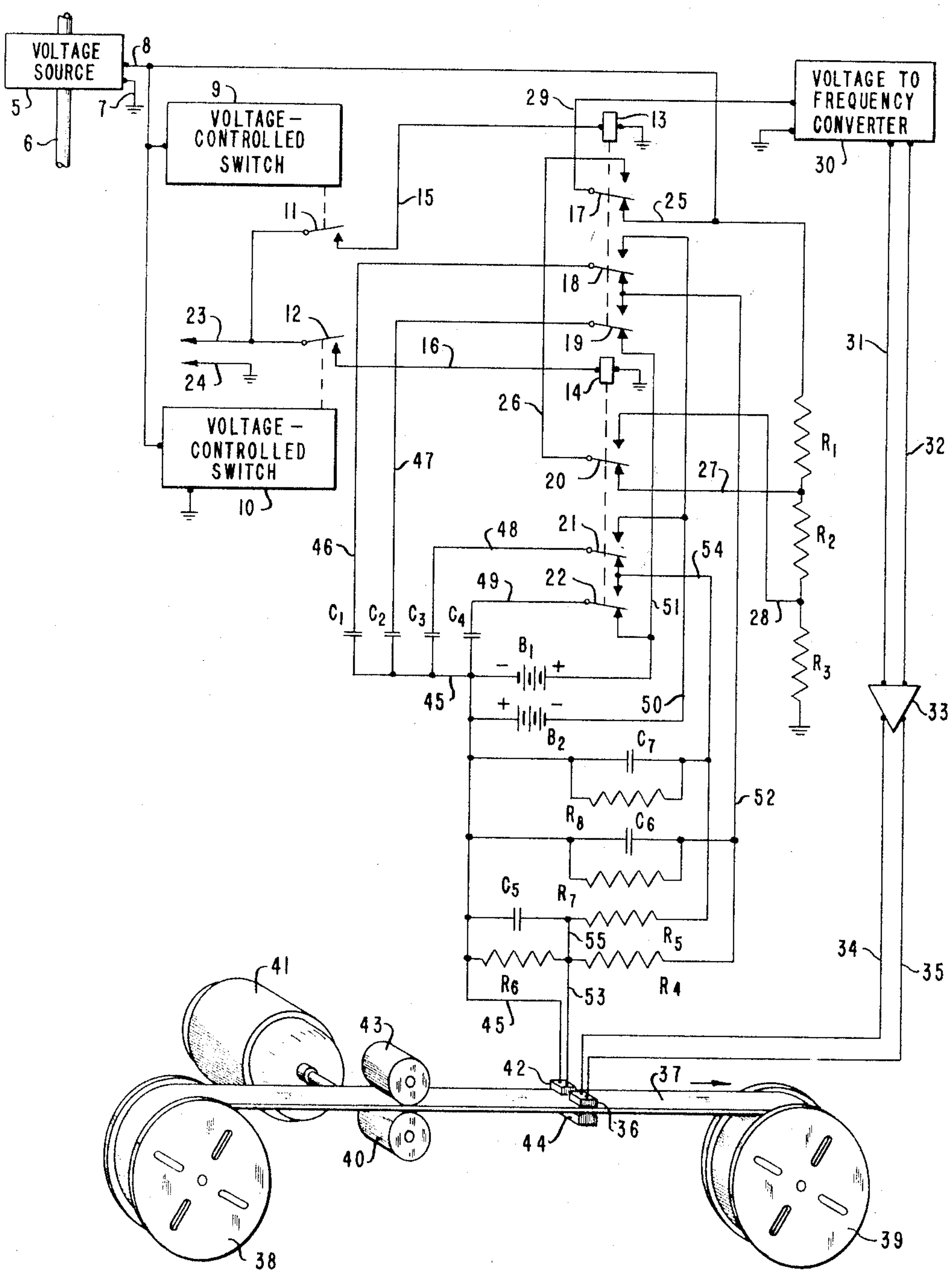
FIGURE 1 is a diagram showing the recording system, including the variable-ratio amplitude-to-frequency converter, the ratio-signal generator and the multi-channel recorder.

Referring to FIGURE 1, the source signal is generated in a voltage source 5, e.g., a thermal conductivity cell which senses the conductivity of a fluid stream flowing through a duct 6. This signal is transmitted via an input circuit 7, 8, and applied by the latter to an attenuator comprising serially connected resistors $R_1$, $R_2$, and $R_3$. These resistors have values in accordance with the several attenuation ratios desired, e.g., 240K, 15K, and 1K ohms, respectively, when ratios of 1:1, 1:16, and 1:256 are to be used. The lower end of $R_3$ is connected to the circuit 7 through ground.

Voltage-sensitive switches 9 and 10 are also connected to the circuit 8 and include control switches 11 and 12 which, when closed, apply operating voltage to solenoids 13 and 14, respectively, via circuits 15 and 16. These solenoids control three-pole, double-throw relay switches having armatures 17–19 and 20–22, respectively. The operating voltage is applied at 23, 24. The switch 9, 11 is adjusted to be open when the voltage in the circuit 8 is below a first level A and to close when the voltage exceeds A; similarly, the switch 10, 12, is open below a level B and closes above that level. B is higher than A, e.g., sixteen times higher when the above-stated ratios are used, although it is not essential that the levels A and B be related in the same ratio as the attenuation ratios. It may be noted that it is not always essential to employ control switches 9–12 in addition to the relay solenoids 13 and 14; when the power in the circuit 7, 8 is sufficient, these solenoids can be operated directly from the signal circuit, being connected thereto directly or through additional amplifiers, not shown, and adjusted or modified to attain the desired operation of their armatures.

The upper armatures 17 and 20 control the attenuation. The N.C. (normally closed) or back contact of the former is connected via a circuit 25 to the junction of the circuit 8 and the resistor $R_1$ and the N.O. (normally open) or make contact is connected by a circuit 26 to the armature 20. The N.C. contact of the latter is connected by a circuit 27 to the junction of $R_1$ and $R_2$ and the N.O. contact via a circuit 28 to the junction of $R_2$ and $R_3$. The armature 17 is connected by a circuit 29 to a voltage-to-frequency converter 30 which generates a series of electrical pulses in its output circuit 31, 32 at a frequency which bears a fixed ratio to the voltage in the circuit 29.

The circuit 31, 32 is connected to an amplifier 33, and the amplified output is applied via circuit 34, 35, to a recording head 36 which is positioned to record the pulses as a series of magnetic bits on one channel of a magnetic tape 37. The tape is moved in the arrow direction from a supply reel 38 onto a take-up reel 39 at a rate determined by a capstan roller 40 driven by a motor 41.

The recorder further includes a second recording head 42 (which may be physically integral with the head 36 but is shown separately for clarity) positioned to record ratio signals on another channel of the tape 37. An idler roller 43 may be positioned opposite the capstan and a stationary back-up plate 44 opposite the recording heads; however, these details are subject to variations. Because the mechanical details of tape recorders are well known, no further description thereof is presented.

The ratio signals are recorded as bits having either positive or negative magnetic fields, derived from suitable sources of polarized voltages, represented by batteries $B_1$ and $B_2$. These signals are applied under control of the two lower armatures of the two relays as follows: the negative side of $B_1$ and the positive side of $B_2$ are connected by a circuit 45 to one side of the recording head 42 and to capacitors $C_1$, $C_2$, $C_3$, $C_4$, and $C_5$ (which may, for example, be 0.05 mfd.). The other sides of the first four of these capacitors are connected by circuits 46–49, respectively, to the armatures 18, 19, 21, and 22. The N.O. contacts of armatures 18 and 21 are connected by a circuit 50 to the negative side of $B_2$; the N.C. contacts of the armatures 19 and 22 are connected by a circuit 51 to the positive side of $B_1$; the N.C. contact of the armature 18 and the N.O. contact of the armature 19 are connected by a circuit 52 through a resistor $R_4$ (e.g., 2K ohms) to a circuit 53 which is connected to the other side of the recording head 42; and the N.C. contact of the armature 21 and the N.O. contact of the armature 22 are connected by a circuit 54 through a resistor $R_5$ (e.g., 2K ohms) and circuit 55 to the said circuit 53. Circuit 55 is further connected to the other side of capacitor $C_5$. A load resistor $R_6$ (e.g., 4K ohms) is connected in shunt with the capacitor $C_5$.

Optionally, to insure good operation despite chatter of the relay contacts, there may be provided: A capacitor $C_6$, shunted by a resistor $R_7$, connected between the circuits 45 and 52; and a capacitor $C_7$, shunted by a resistor $C_8$ is connected between the circuits 45 and 54. The capacitors $C_6$ and $C_7$ are preferably large in relation to $C_1$–$C_4$, e.g., 0.25 mfd., and the resistors $R_7$ and $R_8$ may then be about 250 ohms.

*Operation of recorder*

The source signal in circuit 7, 8 is always applied across the full impedance presented by the series resistors $R_1$, $R_2$, and $R_3$, regardless of the conditions of the relays. When the source signal is below the level A (condition 1), all relays are in their non-operated conditions shown and the full amplitude is applied to the converter 30 via the circuits 25 and 29. The converter thereby produces a signal in circuit 31, 32 having a ratio $r$ to the amplitude of the source signal.

When the source signal rises to a level between A and B (condition 2) the switch 9, 11, and the upper relay operate; the armatures 17–19 being operated, the input signal to the converter 30 is now taken across $R_2$ and $R_3$, via circuits 27, 26, and 29 and is attenuated. The ratio of the frequency in the output of the converter to the amplitude of the source signal is now $$r\cdot\frac{R_2+R_3}{R_1+R_2+R_3}$$

When the amplitude attains or exceeds the level B (condition 3) the switch 10, 12, and lower relay operate; the signal to the converter is now applied via circuits 28, 26, and 39 and the frequency to amplitude ratio is $$r\cdot\frac{R_3}{R_1+R_2+R_3}$$

The capstan 40 being operated at a constant speed, the pulses are recorded by the head 36 in tape channel 1 at a frequency having one of the stated three ratios to the source amplitude. When the unit is first started, condition 1 prevails and no record is made in tape channel 2 opposite the head 42. Whenever there is a change from one condition to a higher-numbered condition, e.g., during the operation of either relay, a short positive pulse is recorded in channel 2. This is generated as follows:

During condition 1, illustrated in FIGURE 1, the capacitors $C_2$ and $C_4$ are connected across $B_1$ and are charged; the capacitors $C_1$ and $C_3$ are discharged, being shunted by the resistors $R_4$ and $R_5$, respectively, in series with $R_6$; and capacitor $C_5$ is discharged by its resistor $R_6$. Hence no current flows through the recording head 42. When the upper relay 13, 17–19, is operated, the charged capacitor $C_2$ is connected to circuit 52 and discharges through $R_4$; this charges $C_5$ and $C_1$ and sends a short positive pulse through the recording head 42. The pulse ceases when capacitor $C_5$ and $C_3$ are discharged. Simultaneously the capacitor $C_1$ is disconnected from the circuit 52 and connected across $B_2$ and charges. Similarly, when the lower relay 14, 20–22, is operated, the charged capacitor $C_4$ transmits a surge via circuit 54 and $R_5$ to charge $C_5$ and $C_2$ and produce another positive pulse in the recording head; and the capacitor $C_3$ is connected across $B_2$ and charges. Hence a positive bit is recorded on tape channel 2 when the upper relay operates upon a change from condition 1 to condition 2 as well as when the lower relay operates upon a change from condition 2 to condition 3.

When the lower relay is released, the charged capacitor $C_3$ transmits a negative pulse via circuit 54 and $R_5$ to record a negative bit in tape channel 2; this indicates a change from condition 3 to condition 2. Similarly, when the upper relay is released, the charged capacitor $C_1$ transmits a negative pulse via circuit 52 and resistor $R_4$ to record a negative bit in tape channel 2; this denotes a change from condition 2 to condition 1.

The elements $B_1$, $C_2$, $C_4$, and armatures 19 and 22, together with the resistors $R_4$–$R_6$ and capacitor $C_5$ therefore form part of a signal generator for emitting a positive pulse upon an increase in the ratio. Similarly, the elements $B_2$, $C_1$, and $C_3$, and armatures 18 and 21, together with the resistors $R_4$–$R_6$ and capacitor $C_6$ form means for emitting a negative pulse upon a decrease in the ratio.

When moving back and forth between consecutive conditions only one of the relays is repeatedly operated and released, causing alternate positive and negative bits to be recorded.

It is evident that the principle can be applied to any desired number of conditions by multiplying the number of relays and predetermined attenuation ratios.

Figure 2:
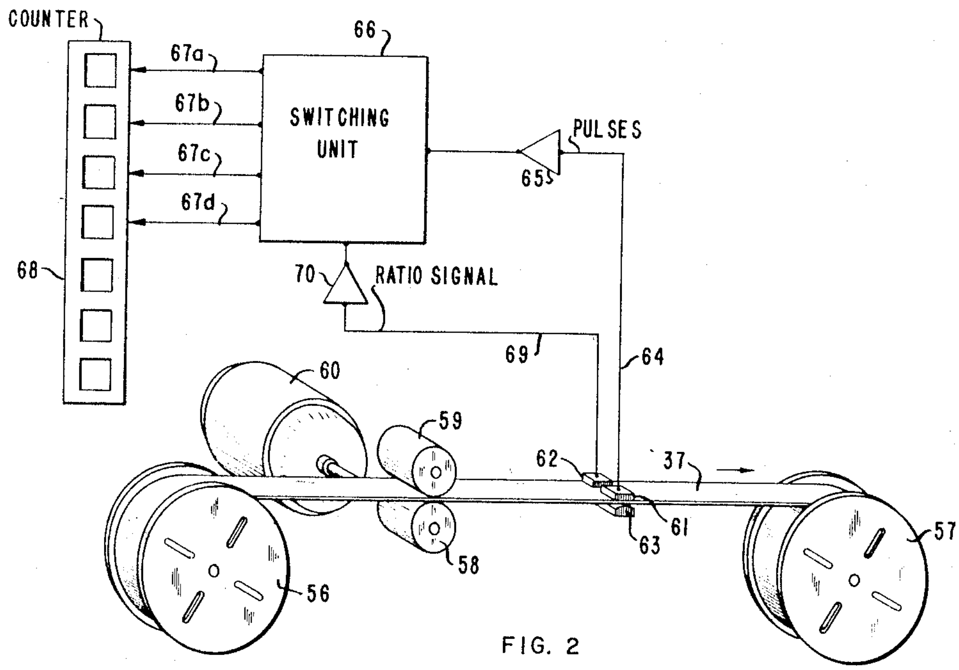
FIGURE 2 is a simplified diagram of the reading system.

Referring to FIGURE 2, the tape 37 can be played back in apparatus having transport devices like those previously described, viz, supply and tape-up reels 56 and 57, capstan 58, back-up roller 59, drive motor 60, read-heads 61 and 62 and a back-up plate 63. For simplicity circuits are in this view shown as single lines. It may be noted that the motor 60 may, but need not, in every case be operated at a constant speed, depending on the method used in analyzing the record. The magnetic bits in tape channel 1 are transmitted as pulses by circuit 64 to an amplifier 65 and the amplified pulses are applied through a switching unit 66 to a selected one of the several inputs 67*a*, 67*b*, 67*c*, or 67*d* of a counter 68. These inputs may be to adjacent or non-adjacent digital positions, and the counter may be of any suitable type, preferably electronic. Each digital position may bear a ratio of 2, 10 or any other desired ratio to the next lower one. The input is selected by the switching unit in accordance with the ratio pulses from tape channel 2 transmitted by circuit 69 and amplifier 70.

The count accumulated in the counter 68 will have a constant ratio to the amplitude of the source signal. For example, at low amplitudes, when the tape record was made under condition 1, the ratio of the frequency of the pulses in the circuit 64 to the source signal amplitude is $r$. When condition 2 or a higher condition prevails the ratio is smaller; but the pulses are added directly to a higher order position in the counter, so that the total count will again bear the same ratio $r$ to the amplitude of the source signal.

Figure 3:
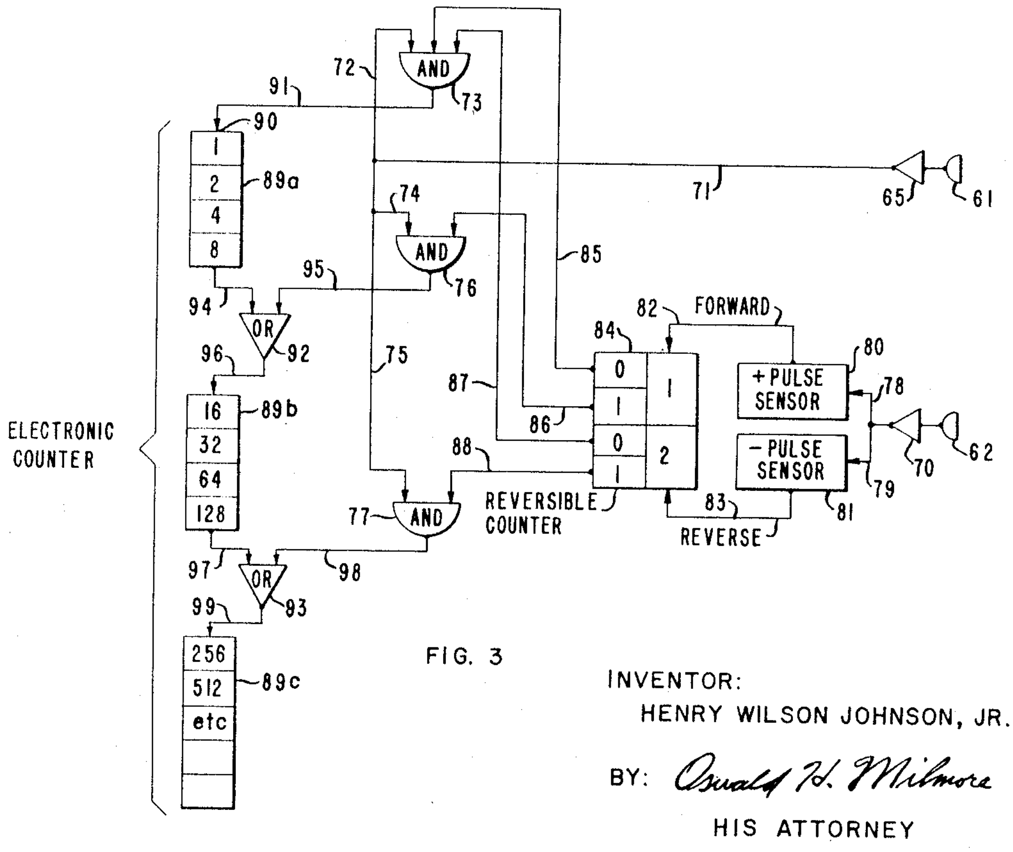
FIGURE 3 is a more detailed diagram showing a specific arrangement of the switching unit and counter.

A specific embodiment of the switching system is shown in FIGURE 3. In this example non-consecutive digital positions of a binary counter are used as inputs, these being selected to receive ratio signals of the type described in connection with FIGURE 1, using ratios of 1:1, 1:16, and 1:256.

The amplified pulses from the read-head 61 is applied by a circuit 71 and branch circuit 72 to one input of an electronic logical product device 73 known as an AND gate. It is further applied by branch circuits 74 and 75 to inputs of AND gates 76 and 77. The amplified ratio signal from the read-head 62 is applied by circuits 78 and 79 to sensor units 80 and 81, respectively of which the former responds to pulses caused by positive magnetic bits and the latter to those produced by negative bits on tape channel 2. These sensor units emit electrical pulses in output circuits 82 and 83, respectively, each time a pulse of the proper type is received. The output circuits are connected to the "forward" and "reverse" control inputs, respectively, of a reversible electronic counter 84, having two binary stages, the low-order stage being indicated "1" and the high-order stage "2." The two possible stages of each stage are indicated at the left. Thus, in its normal position both stages are in the "0" conditions. A pulse from circuit 82 places the low-order stage 1 in the "1" condition; the next positive pulse restores the low-order stage to "0" and, by carry-over, sets the high-order stage 2 to "1." The reverse operations occur when pulses are applied by circuit 83. The conditions of the stages are indicated by voltages in output circuits 85–88, it being understood that in any particular condition only one of the two circuits from the same stage carries a voltage of the same polarity as that of the pulses in circuit 71. Circuits 85 and 87 are connected to additional inputs of the AND gate 73; circuit 86 to an additional input of the AND gate 76; and circuit 88 to an additional input of the AND gate 77.

An electronic binary counter is shown in sections at 89*a*, 89*b*, and 89*c*, the sections being shown separated only for clarity: each of the first two includes four digital positions and section 89*c* the remaining positions. Each stage or digital position has an input, activated for carry-over from a preceding position, and the low-order position has an input 90 which is connected by a circuit 91 to the output of the AND gate 73. The carry-over circuit between the fourth and fifth positions—as well as that between the eighth and ninth positions—are modified by interposing an electronic logical sum device 92 and 93, known as OR gates. Thus, the output from the section 89*a*, which emits a carry signal from the fourth position, is connected by a circuit 94 to one input of the OR gate 92, and the output from the gate 76 is applied to another input of the OR gate by a circuit 95, and the output from the latter is applied by a circuit 96 to the fifth position. Similarly, circuits 97 and 98 apply the output of the eighth position and of the gate 77 to the two inputs of the OR gate 93, the output of which is applied to the ninth position by a circuit 99.

In operation, when a section of tape recorded under condidion 1 is read, both stages of the reversible counter 84 are in the "0" condition; hence circuits 85 and 87 carry a voltage which is the same as that of the pulses in circuit 71, e.g., a negative voltage (although the system can also operate with positive voltages and pulses). The gate 73 therefore transmits all pulses from the circuit 71, and these pulses are counted in the electronic counter 89*a*–89*c*. Because circuits 86 and 88 are not similarly energized, the gates 76 and 77 do not pass pulses. Because the gates 92 and 93 pass any pulse applied to their inputs, the carry pulses between sections of the counter are correctly transmitted.

At the start of a record section made under condition 2 (attenuation by a factor of sixteen), a positive pulse is read by the head 62; this is blocked by the sensor 81 but the sensor 80 emits a pulse through circuit 82 to set the reversible counter to "0–1" (high-order position being given first). Circuit 85 being now deenergized, the gate 73 no longer transmits pulses from the circuit 71; instead, these pulses are transmitted by the gate 76 because the circuit 86 is now energized. This pulse passes the gate 92 and is counted as sixteen pulses by the fifth digital position. Similarly, at the start of a record section made under condition 3 (attenuation factor of 256) another positive pulse from the head 62 is transmitted via the sensor 80 to set the reversible counter to "1–0", thereby energizing the circuits 85 and 88 and deenergizing the circuits 86 and 87; hence pulses from circuit 71 are now transmitted only via circuit 75 and gates 77 and 93 to be counted as 256 pulses in the ninth digital position.

When passing from a condition higher than 1 to a lower condition a negative pulse is received at the head 62, and only the sensor 81 emits a reversing pulse in circuit 83 to set the reversible counter 84 back one count for each reversing pulse. This causes the pulses from circuit 71 to be added to a low-order position of the counter 89*a*–89*c*.

It should be understood that the specific circuits may in practice be modified to adapt them to the characteristics of the counter. For example, when the carry and/or input pulses of the counter include positive and negative portions, rectifiers would be used in the circuits 94 and 97 and suitable pulse generators in the circuits 91, 96, and 99.

I claim as my invention:

1. In apparatus for preparing a tape record carrying a frequency-modulated signal in machine-sensitive form, the combination of:

(a) an input circuit for a source analog signal,
(b) an analog-to-frequency converter means for converting said source signal to a frequency having a controlled, variable ratio to the amplitude of said source signal,
(c) means for generating a signal indicating the said ratio,
(d) first means for recording on a first channel of an elongated record a plurality of signal elements corresponding in number to the converted frequency, and
(e) second means for recording on at least one other channel of said record the said ratio signal.

2. Apparatus for reading a tape record prepared by the apparatus defined in claim 1 which comprises:

(a) means for transporting said tape,
(b) first and second reading elements positioned to read respectively said first and the other tape channels and generating, respectively, a series of pulses corresponding to the signal elements in the first channel and reproduced ratio signals,
(c) a multi-position digital counter having separate inputs for a plurality of digital positions,
(d) switching means connected to said first reading element for applying said series of pulses selectively to one of said inputs,
(e) control means connected to the second reading element for actuating the said switching means in accordance with the reproduced ratio signals.

3. Apparatus as defined in claim 1 wherein said converter means comprises:

(a) a multi-position attenuator connected to said input circuit for attenuating said source signal by any of a plurality of predetermined attenuation ratios, and
(b) an analog-to-frequency converter connected to the output of said attenuator which generates a frequency having a fixed ratio to the attenuated signal.

4. In combination with the apparatus defined in claim 3, (a) means for measuring the amplitude of said source signal, and
(b) means responsive to said measuring means for altering the position of said attenuator to increase the attenuation ratio on a rise in the measured amplitude and decrease said ratio on a fall in the measured amplitude.

5. Apparatus as defined in claim 1 wherein said means for generating a signal indicating the said ratio comprises:

(a) a first generator for emitting a signal of one form upon an increase in the said ratio, and
(b) a second generator for emitting a signal of a different form upon a decrease in the said ratio,
(c) said first and second generators having their outputs connected to the said second recording means for recording signals of both forms in at least one channel other than said first channel, and
(d) said converter means is of the type which converts the amplitude to a frequency having one of a plurality of predetermined ratios to the source signal.

6. Apparatus for reading a tape record prepared by the apparatus defined in claim 5 which comprises:

(a) means for transporting said tape,
(b) first and second reading elements positioned to read respectively said first and other tape channels and generating, respectively, a series of pulses corresponding to the signal elements in the first channel and reproduced ratio signals of one of two different forms,
(c) a multi-position digital counter having separate inputs for a plurality of digital positions,
(d) switching means connected to said first reading element for applying said series of pulses selectively to one of said inputs, and
(e) control means connected to said second reading element for actuating said switching means to shift the input to a higher-order digital position whenever a reproduced ratio signal of one form is received and for shifting the input to a lower-order position whenever a reproduced ratio signal of the other form is received.

7. Apparatus for reading a tape record which contains, in one channel, a plurality of machine-sensitive signal elements along the length thereof bearing a variable ratio to the amplitude of a source signal and, in a second channel thereof, machine-sensitive signals indicating the said ratio, which comprises:

(a) means for transporting said tape,
(b) first and second reading elements positioned to read respectively said first and at least one other tape channel and generating, respectively, a series of pulses corresponding to the signal elements in the first channel and reproduced ratio signals,
(c) a multi-position digital counter having separate inputs for a plurality of digital positions,
(d) switching means connected to said first reading element for applying said series of pulses selectively to one of said inputs,
(e) control means connected to the second reading element for actuating the said switching means in accordance with the reproduced ratio signals.

8. Apparatus for reading a tape record which contains, in one channel, a plurality of machine-sensitive signal elements along the length thereof bearing a ratio to the amplitude of a source signal which ratio has one or a predetermined plurality of values, and in a second channel thereof, machine-sensitive signals of two forms indicating respectively an increase and a decrease in the said ratio, which comprises:

(a) means for transporting said tape,
(b) first and second reading elements positioned to read respectively said first and second tape channels and generating, respectively, a series of pulses corresponding to the signal elements in the first channel and reproduced ratio signals of one of two different forms,
(c) a multi-position digital counter having separate inputs for a plurality of digital positions, (d) switching means connected to said first reading element for applying said series of pulses selectively to one of said inputs, and (e) control means connected to said second reading element for actuating said switching means to shift the input to a higher-order digital position whenever a reproduced ratio signal of one form is received and for shifting the input to a lower-order position whenever a reproduced ratio signal of the other form is received.

No references cited.

ROBERT C. BAILEY, *Primary Examiner.*

G. D. SHAW, *Assistant Examiner.*